Patented June 2, 1942

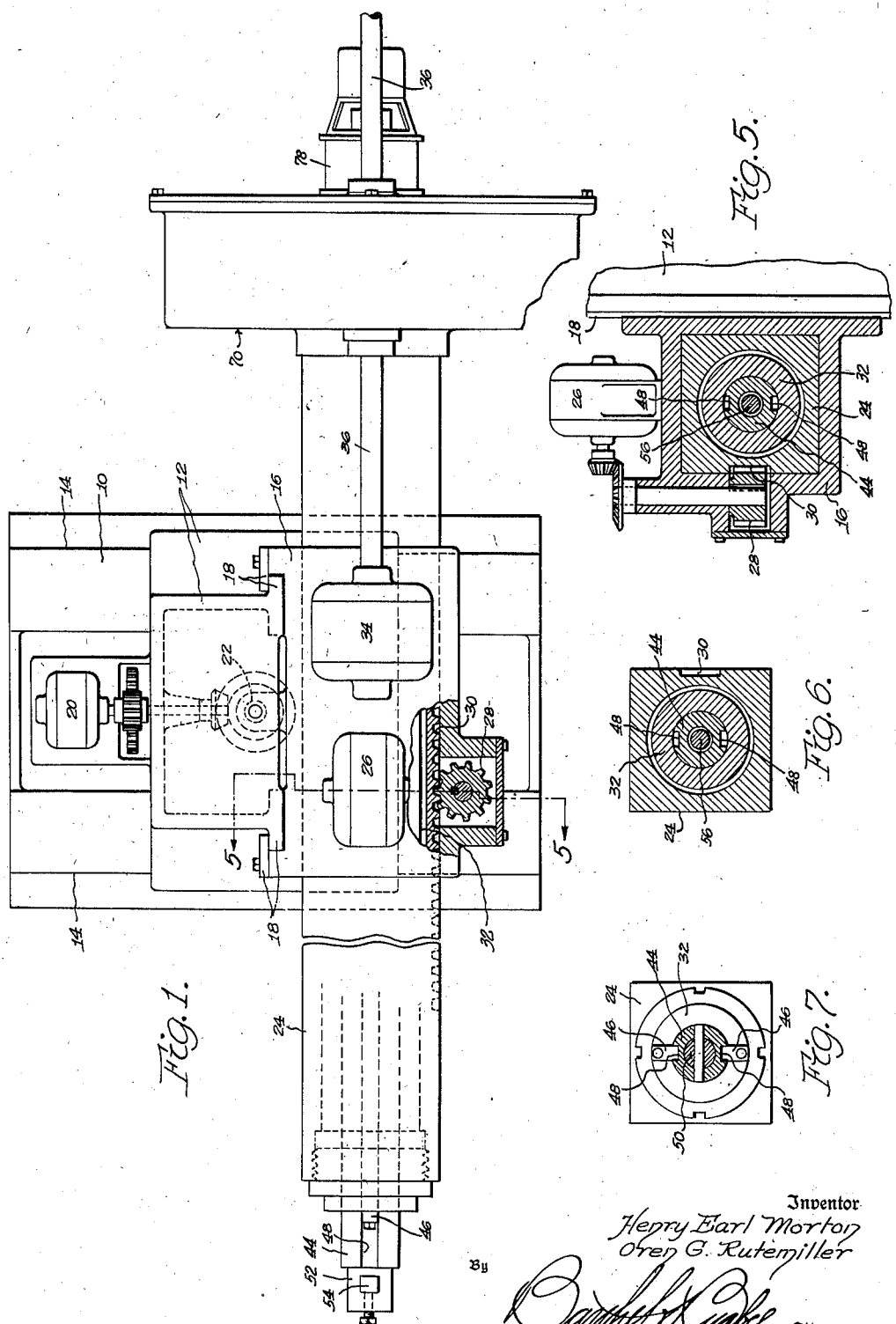

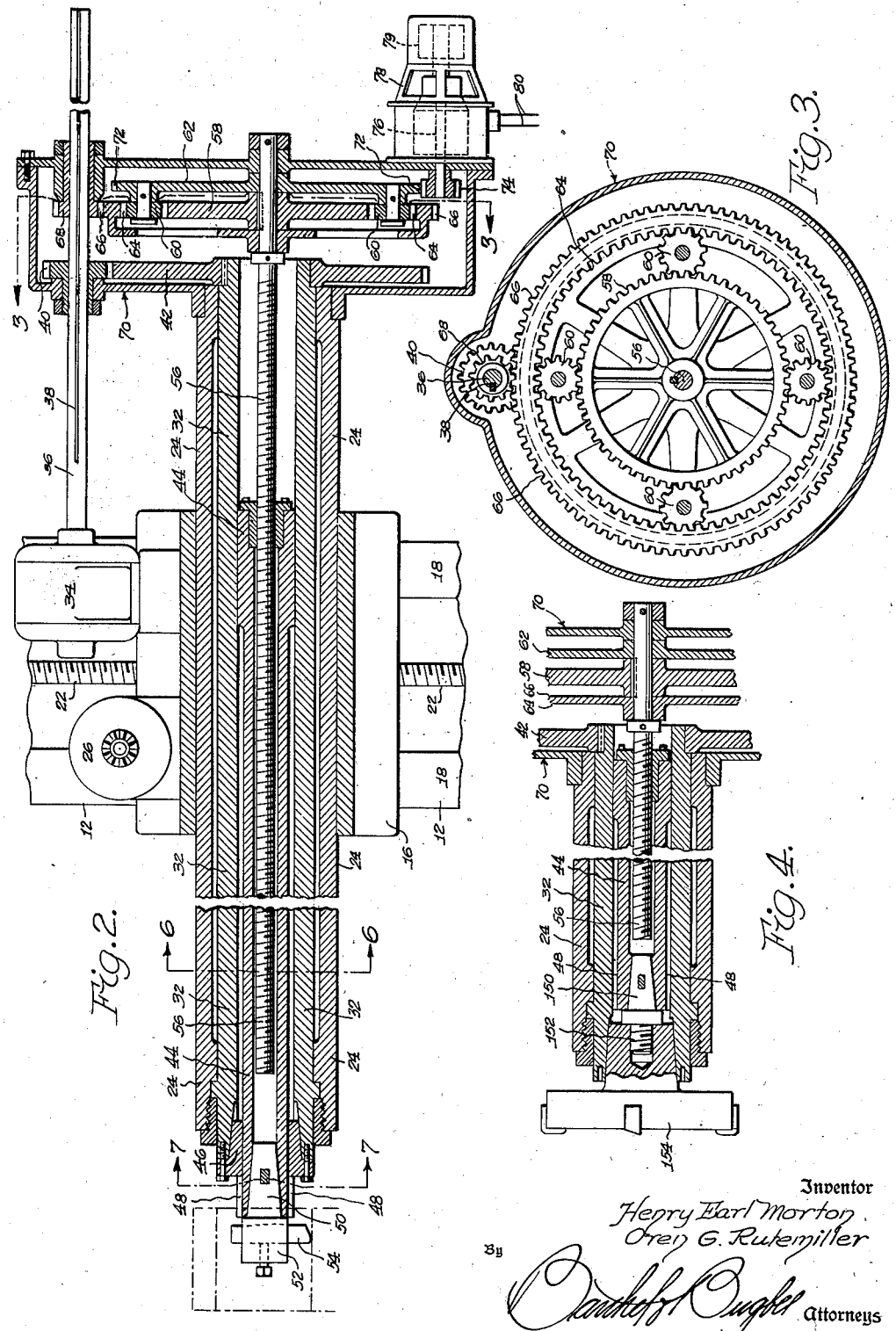

2,284,758

UNITED STATES PATENT OFFICE 2,284,758

CUTTING MACHINE

Henry Earl Morton, Muskegon, and Oren G. Rutemiller, Detroit, Mich.; said Morton assignor to Morton Manufacturing Company, Muskegon Heights, Mich., a corporation of Michigan, and said Rutemiller assignor to Westinghouse Electric & Manufacturing Company, East Pittsburgh, Pa., a corporation of Pennsylvania Application June 9, 1941, Serial No. 397,248

5 Claims. (Cl. 77—3)

This invention relates, in general, to cutting machines, and, in particular, to a new and improved tool operating mechanism therefor.

One of the objects of the present invention is to provide for a cutting machine a new and improved tool operating mechanism, the construction of which is simple and compact and the manipulation of which is easily and selectively controlled.

Another object is to improve a cutting machine so that its tool may be moved relatively to the work, as well as to the remainder of said machine, with greater ease, speed and accuracy than heretofore.

Another object is to provide a cutting machine with a tool operating mechanism which is so new and improved that it obviates substantially all of the faults found with mechanisms of a similar type at present well known and in use.

Other objects and advantages of the invention will become readily apparent from a reference to the following specification taken in conjunction with the accompanying drawings, of which there are two (2) sheets and wherein:

Figure 1 is a plan view of the machine with a part thereof broken away and in section to illustrate more clearly the details of construction thereat;

Figure 2 is a horizontal sectional view taken longitudinally through the tool supporting and operating structure of the machine;

Figures 3, 6 and 7 are sectional views taken along the lines 3—3, 6—6 and 7—7, respectively, in Figure 2;

Figure 4 is is a view similar to Figure 2 but shows a slightly modified form of head end; and Figure 5 is a sectional view taken along the line 5—5 in Fig. 1.

Referring to the drawings, the machine comprises a base 10 upon which is mounted a vertical column 12, said column, if desired, being horizontally movable relatively to said base along guides 14 under the influence of whatever motivating force may be selected therefor. Column 12 supports a saddle 16 for vertical movement, selectively, along guides 18, such saddle movement being effectuated by means of a motor 20 which is operatively connected to a screw 22 which, in turn, is operatively connected to said saddle. Saddle 16 is hollow in order to receive and support an elongated, non-rotatable, axially movable ram 24, such ram movement being selectively effectuated by means of a motor 26 which is operatively connected to a pinion 28, which, in turn, is operatively connected to a rack 30 on said ram. Ram 24 is also hollow in order to receive and support an elongated, hollow arbor 32 which is so connected to said ram as to be rotatable relatively thereto but axially movable therewith, such arbor rotation being selectively effectuated by means of a motor 34 having an elongated drive shaft 36 to which is splined, as at 38, a pinion 40 which is in driving engagement with a gear 42 keyed to the rear end of said arbor. Arbor 32 carries within itself an elongated, hollow spindle 44 which is so connected to said arbor, by means of an interengaging key 46 and keyway 48, as to be axially movable relatively thereto but rotatable therewith, such spindle movement falling within the scope of the invention and being discussed more fully later on. As shown in Figure 2, the head end of spindle 44 normally resides outwardly of arbor 32 and is adapted for internally receiving and holding the shank 50 of a tool holder 52 which is capable of supporting a tool such as the one shown at 54.

Spindle 44 carries within itself and has threadedly secured thereto a screw 56 which extends outwardly through the rear end of arbor 32 to receive thereupon a sun gear 58 which is keyed thereto for rotation therewith, said screw, though rotatable either with or relatively to said spindle, being secured against axial movement relatively to said arbor. Gear 58 is in operative engagement with a set of planet gears 60 which are carried in arcuately spaced relationship to each other by means of an annular carrier 62 freely mounted at its hub upon the outer end of screw 56 on one side of said gear 58, said planet gears, as is usual, being rotatable about their respective axes and also with said carrier about the axis of said screw. On the opposite side of gear 58 screw 56 also freely carries an internal-external gear 64—66, the internal teeth 64 of which circumvent and are in operative engagement with planet gears 60 and the external teeth 66 of which are in operative engagement with a pinion 68 keyed to shaft 36 for rotation therewith and axial movement therealong by means of spline 38 alongside pinion 40. If desired, the mechanism carried at the rear ends of arbor 32 and screw 56 may be enclosed by an annular, non-rotatable casing, generally indicated at 70, which is fixed at its front hub portion to and about the rear end of ram 24 and has journalled into its rear hub portion the actual rear end of said screw, the upper end of said casing being provided with aligned front and rear bearing portions in which are journalled pinions 40 and 68. As can be readily seen, protraction or retraction of the elements 24, 32, 44, 56, 70 and the mechanism confined within said latter element, upon operation of motor 26 in either one or the other of its two possible directions, is as a unit and is relative to shaft 36—38. It will also be noted that operation of motor 34 in either one or the other of its two possible directions effectuates unitary rotation of pinions 40 and 68, the power from said pinion 40 being transmitted to arbor-spindle unit 32—44 through gear 42 and the power from said pinion 68 being transmitted to screw 56 through gears 66—64, 60 and 58.

The gear ratio between pinion 40 and gear 42 and that between pinion 68 and gears 66—64, 60 and 58 are designed so that said gears 42 and 58 will, during application of no other force to the mechanism confined within casing 70 than that applied by motor 34 through said pinions 40 and 68, rotate at a common speed and in a common direction, this meaning that spindle 44 will have no axial movement relatively to screw 56 but will be rotated unitarily therewith. During this interval of force application exclusively by motor 34, arbor-spindle unit 32—44 is driven directly by pinion 40 through gear 42, whereas screw 56 is driven indirectly by pinion 68 through gears 66—64, 60 and 58, said pinion 68 driving said gear 66—64 about the latter's axis because of the inter-engagement of the teeth of said pinion 68 and the external teeth 66 of said gear 66—64, said gear 66—64 driving said gears 60 about the latters' axes because of the inter-engagement of the internal teeth 64 of said gear 66—64 and the teeth of said gears 60, and said gears 60 driving said gear 58 about the latter's axis because of the inter-engagement of said teeth of said gears 60 and the teeth of said gear 58, there being during said interval no movement of said gears 60 about the axis of carrier 62 because of the rotative inactivity of said carrier. In other words, as long as there is no rotation of carrier 62 about its axis, there will be no relative rotation between gears 42 and 58.

Operative connection between a set of teeth 72 formed on the periphery of carrier 62 and the teeth of a pinion 74 carried on the drive shaft 76 of a motor 78 has been found successful in preventing rotation of said carrier during inactivity of said motor and activity of motor 34, but it may be desired to provide said motor with a solenoid brake, shown only diagrammatically and in dotted lines at 79, of any well known make and/or design in order to supplement the opposition to said carrier rotation offered by said connection 72—74. Be that as it may, however, when motor 78, which is preferably of the bi-directional, variable speed type and energized through conduits 80, is put into operation supplementarily to motor 34, the resulting rotation of carrier 62, whether in one direction or the other, upsets the normal drive between planet gears 60 and sun gear 58 to establish a rotative speed differential between gears 42 and 58, the ultimate result being that spindle 44 is caused to move axially relatively to screw 56 because of the rotative speed differential set up therebetween.

For instance, if carrier 62 is caused to rotate in the same direction as external-internal gear 66—64, the driving effect of internal teeth 64 upon planet gears 60 will be reduced below normal, the driving effect of said planet gears upon sun gear 58 will resultingly be reduced below normal, and it follows that the speed of said sun gear will be reduced below that of gear 42; in other words, screw 56 will be rotated at a slower speed than spindle 44 with the result that the latter will move in one of its two possible axial directions along the former. On the other hand, if carrier 62 is caused to rotate in a direction opposite that of external-internal gear 66—64, the driving effect of internal teeth 64 upon planet gears 60 will be raised above normal, the driving effect of said planet gears upon sun gear 58 will resultingly be raised above normal, and it follows that the speed of said sun gear will be raised above that of gear 42; in other words, screw 56 will be rotated at a higher speed than spindle 44 with the result that the latter will move in the other of its two possible axial directions along the former. It seems clear from the above that, with proper manipulation of motor 78 either in conjunction with motor 34 or independently thereof, practically any protractive or retractive speed of spindle 44 relatively to arbor 32 can be obtained in order to accommodate tool 54 to any one of a number of desired services.

Referring now to the modification shown in Figure 4, it will be seen that the tool-holder-shank unit 54—52—50 has been replaced by a tool-holder-shank unit 154—152—150, said tool 154 to be used for a different purpose than said tool 54 and said holder 152 being threaded for reception into a threaded portion provided therefor in the shank of said tool 154 so as to unify said tool 154, said holder 152 and said shank 150. It will also be seen that shank 150 is inserted into and joined with the head end of spindle 44 similarly as was shank 50 and that said spindle is in its fully retracted position with respect to arbor 32. When so retracted, it can be seen that the head end of arbor 32, which was tapered to receive keys 46, now wedgingly receives the shank of tool 154 so that said tool, said arbor, spindle 44 and screw 56 may rotate unitarily, it being assumed that motor 78 has been made idle after bringing the parts into their respective positions as shown in Figure 4.

Although the invention has been described with some detail, it is to be understood that such description is for the purpose of illustration only and is not to be taken as being definitive of the limits of the inventive idea. The right is reserved to make such changes in the details of construction and arrangement of parts as will fall within the purview of the attached claims.

What we claim is:

1. In an apparatus of the character described, a pair of movable members co-adapted to prevent rectilinear movement relatively one to the other during rotation of both at a common speed and to permit such relative rectilinear movement during relative rotation therebetween, one of said members being rotated at a predetermined speed and the other of said members having a sun gear carried thereon for rotating said last mentioned member, drive means, gear means in operative engagement with said drive means for being rotated thereby, a plurality of planet gears arranged between said gear means and said sun gear for being rotated by the former to rotate the latter, supporting means normally supporting said planet gears for rotation exclusively about their axes so that the rotative speed of said other member is the same as said predetermined speed, and means for selectively moving said supporting means to move said planet gears about the axis of said sun gear so that said other member is caused to rotate relatively to said one member.

2. In an apparatus of the character described, a rotatable drive member, a tool support normally rotatable with said member but operable during relative rotation therebetween for rectilinear movement relatively thereto, drive means, means operable responsive to actuation of said first means for rotating said support at a predetermined speed, means also operable responsive to actuation of said first means for being rotated thereby, driven means carried on said member for rotation therewith, means operatively interconnecting said third and fourth means for normally effectuating rotation of the latter at said speed, and variable speed driving means operable independently from first means and operatively connected to said fifth means for selectively rotating said fourth means at a different speed than that of said support.

3. In an apparatus of the character described, a rotatable drive member, a tool support normally rotatable with said member but operable during relative rotation therebetween for rectilinear movement relatively thereto, drive means, means operable responsive to actuation of said first means for rotating said support, gear means rotatably driven by said first means, other gear means in driving connection with said member, still other gear means intermediate said third and fourth means in driven connection with the former and in driving connection with the latter, said first, third, fourth and fifth means cooperating to rotate said member normally at the same speed as said support, and selectively actuated variable speed driving means operable independently of said first means and operatively connected to said fifth means to establish a difference between the rotative speeds of said member and said support.

4. In an apparatus of the character described, a rotatable drive member, a tool support normally rotatable with said member but operable during relative rotation therebetween for rectilinear movement relatively thereto, drive means, means operable responsive to actuation of said first means for rotating said support at a predetermined speed, a sun gear carried on said member for rotation therewith, a plurality of planet gears in driving engagement with said sun gear and supported for rotation about the axes thereof and about the axis of said sun gear, gear means in driven engagement with said first means and in driving engagement with said planet gears, said first means, said third means, said planet gears and said sun gear cooperating to rotate said member at said speed during rotation of said planet gears purely about their axes, and means selectively operable for effectuating rotation of said planet gears about the axis of said sun gear to establish a different speed of rotation for said member.

5. In an apparatus of the character described, a rotatable drive member, a tool support normally rotatable with said member but operable during relative rotation therebetween for rectilinear movement relatively thereto, drive means, means operable responsive to actuation of said first means for rotating said support at a predetermined speed, a sun gear carried on said member for rotation therewith, a plurality of planet gears in driving engagement with said sun gear and rotatable about the axes thereof and about the axis of said sun gear, gear means in driven engagement with said first means and in driving engagement with said planet gears, supporting means normally supporting said planet gears for rotation exclusively about said axes thereof so that the rotative speed of said member is the same as said predetermined speed, and means for selectively moving said supporting means to move said planet gears about said sun gear axis so as to cause said member to rotate relatively to said support.

HENRY EARL MORTON.
OREN G. RUTEMILLER.